Dec. 18, 1934.    H. T. BLOM    1,985,140
VALVE MECHANISM
Filed June 21, 1932
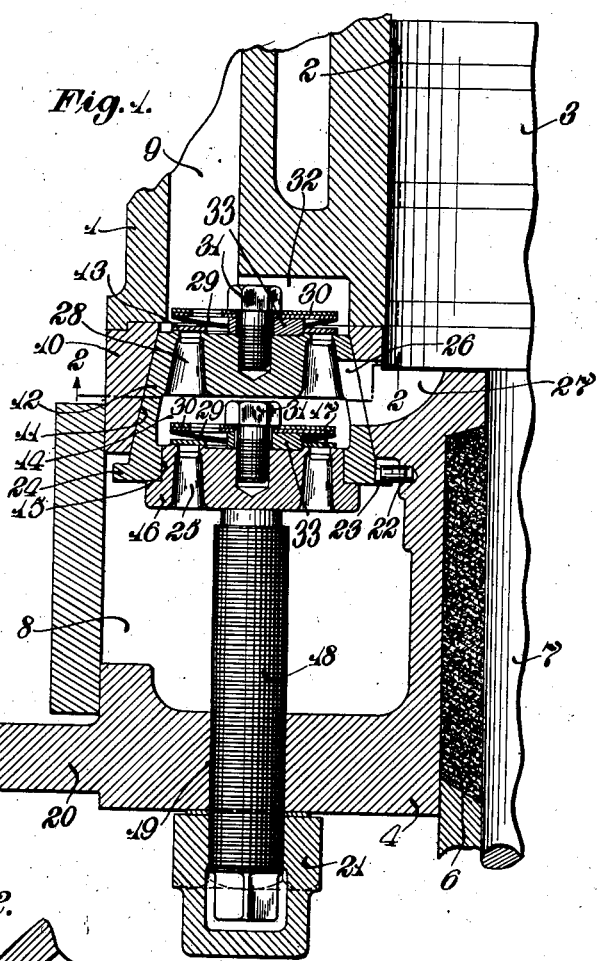
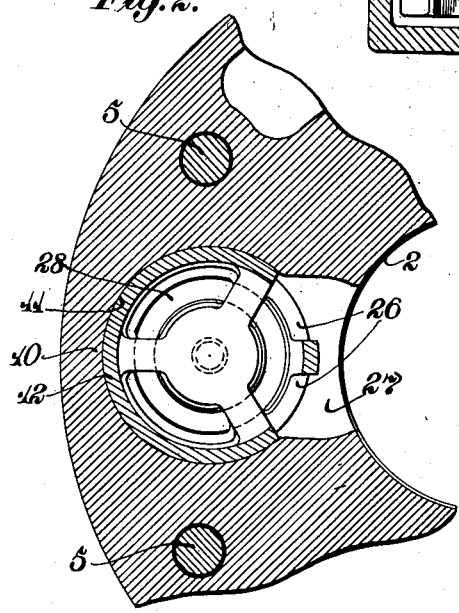
Inventor:
Hjalmar T. Blom.
by
Louis A. Maxson.
Atty.

Patented Dec. 18, 1934

1,985,140

UNITED STATES PATENT OFFICE 1,985,140

VALVE MECHANISM

Hjalmar T. Blom, Michigan City, Ind., assignor to Sullivan Machinery Company, a corporation of Massachusetts Application June 21, 1932, Serial No. 618,501

15 Claims. (Cl. 277—61)

This invention relates to valve mechanisms, and more particularly to improvements in valve mechanisms for fluid compressors or pumps.

An object of this invention is to provide an improved valve mechanism. Another object is to provide an improved valve mechanism of an extremely compact, rugged and durable construction which can be readily assembled and dismantled. A further object is to provide an improved valve seat structure, and improved means for positioning and supporting the valve seat structure within the cylinder structure of the compressor or pump. Yet another object is to provide an improved valve mechanism of the combined inlet and discharge type wherein the valve seat member of the inlet valve is associated with the discharge valve seat member in an improved manner. Another object is to provide an improved valve mechanism of the so-called double "wafer" type particularly adapted for use with small cylinders for high pressure pumps, the improved valve mechanism being of an extremely compact design. These and other objects and advantages of the invention will, however, hereinafter more fully appear in the course of the following description and as more particularly pointed out in the appended claims.

In the accompanying drawing there is shown for purposes of illustration one form which the invention may assume in practice.

In this drawing,—

Fig. 1 is a fragmentary longitudinal sectional view through a part of the cylinder of a compressor or pump, showing the illustrative embodiment of the improved valve mechanism.

Fig. 2 is a transverse sectional view taken substantially on line 2—2 of Fig. 1.

In this illustrative construction there is shown a cylinder 1 of a compressor or pump having a bore 2 containing a reciprocable pump piston 3. Secured to the lower end of the cylinder 1 is a cylinder head 4 attached, as by bolts 5, to the cylinder and carrying a usual stuffing box 6 for the piston rod 7. The cylinder head 4 is provided with an inlet chamber 8, while formed within the cylinder is a discharge chamber 9.

Now referring to the improved valve mechanism, it will be noted that formed within the inner wall 10 of the cylinder head is a conical recess or bore 11 communicating at its upper end with the discharge chamber 9 and at its lower end with the inlet chamber 8. Seated within this conical bore is a conical valve seat member 12, herein the valve seat for a discharge valve 13. Formed within this valve seat member is a chamber 14 and a communicating bore 15, and seated within the bore 15 is a cylindrical valve seat member 16, herein the valve seat for an inlet valve 17, this valve seat member having a bottom flange underlying and seated against the lower face of the valve seat member 12, as shown. For holding the conical valve seat member 12 within its bore and for seating the inlet valve seat member within the valve seat member 12, there is provided a stud 18 abutting centrally against the lower face of the valve seat member 16 and threadedly connected at 19 within the outer wall 20 of the cylinder head, and this stud, when tightened, tightly holds the valve seat parts in position. For locking the stud 18 in its adjusted position, there is provided a usual cap nut 21 threadedly connected to the stud and abutting the lower face of the cylinder head. Rotative movement of the discharge valve seat member 12 within its bore is prevented by a pin 22 engaging in a notch 23 formed in a bottom flange 24 integral with the valve seat member 12.

The structure associated with the valves 13 and 17 will now be briefly described. Formed in the valve seat member 16 are flow passages 25 through which fluid may flow from the inlet chamber 8 past the inlet valve 17 and through the chamber 14, lateral passages 26 formed in the wall of the valve seat member 12 and a passage 27 formed in the cylinder head and communicating with the lower end of the cylinder bore 2. Formed in the valve seat member 12 are similar flow passages 28 for conducting the compressed fluid from the cylinder bore through the passages 27, 26, chamber 14 and past the discharge valve 13 to the discharge chamber 9. The valves 13 and 17 are of the well known "wafer" type and consist of annular discs held in position on their seats by bowed springs 29 each interposed between the valve with which it is associated and a valve guard 30 secured by a screw 31 to the valve seat member, the cylinder being recessed at 32 to receive the screw and guard of the discharge valve mechanism. Suitable spacing and valve guiding members 33 are interposed between the valve guards and the valve seats.

As a result of this invention, it will be noted that an improved valve mechanism is provided, of an extremely rugged and compact design, especially adapted to use with the relatively small cylinders of high pressure compressors or pumps. It will further be noted that by the provision of the improved valve seat structure, the valve mechanisms are positioned and supported within the cylinder head in an improved manner, the inlet valve seat member being seated within the discharge valve seat member, and the seat members being held in position by a stud common to both. These and other advantages of the improved valve mechanism will be clearly apparent to those skilled in the art.

What I claim as new and desire to secure by Letters Patent is:

1. In a valve mechanism for compressors or pumps, a cylinder element having a conical bore, a conical valve seat member arranged in said bore and having a valve associated therewith, said valve seat member having a bore for receiving a second valve seat member, a second valve seat member received in said second bore and having a valve associated therewith and movable in said second bore, and means for holding said seat members in position.

2. In a valve mechanism for compressors or pumps, a cylinder element having a conical bore, a conical valve seat member arranged in said bore, said valve seat member having a chamber and a communicating bore, a valve seat member seated within said valve seat bore, valve mechanisms carried by said valve seat members respectively, the chamber in said first valve seat member receiving the valve mechanism carried by the second mentioned valve seat member, and means acting through the second mentioned valve seat member for holding said valve seat members in position with respect to said cylinder element.

3. In a valve mechanism for compressors or pumps, a cylinder element having a conical bore, a conical valve seat member arranged in said bore, said valve seat member having a chamber and a communicating bore, a valve seat member seated within said valve seat bore, valve mechanisms carried by said valve seat members respectively and each including a valve and a guard individual thereto, the chamber in said first valve seat member receiving one valve mechanism, and a common holding element for securing said valve seat members in position.

4. In combination, in a valve mechanism for compressors or pumps, a cylinder element having a conical bore, inlet and discharge chambers, a conical valve seat member seated within said conical bore and having formed therein a chamber and a communicating bore, a discharge valve mechanism carried by said valve seat member, a second valve seat member seated within the bore in said first valve seat member and carrying an inlet valve mechanism, and means for holding said seat members in assembled relation.

5. In combination, in a valve mechanism for compressors or pumps, a cylinder element having a conical bore, a conical discharge valve seat member arranged in said bore and having formed therein a chamber and a communicating bore, an inlet valve seat member seated within the bore in said discharge valve seat member, inlet and discharge valve mechanisms carried by said seat members respectively, the inlet valve mechanism being arranged within said chamber in said discharge valve seat member, and means acting through said inlet valve seat member for holding both of said valve seat members in position in said cylinder element.

6. In combination, in a valve mechanism for compressors or pumps, a cylinder element having a conical bore, a conical discharge valve seat member arranged in said bore and having formed therein a chamber and a communicating bore, an inlet valve seat member seated within the bore in said discharge valve seat member, inlet and discharge valve mechanisms carried by said seat members respectively, the inlet valve mechanism being arranged within said chamber in said discharge valve seat member, and means acting through said inlet valve seat member for holding both of said seat members in position in said cylinder element, said cylinder element having formed therein a flow passage for connecting said chamber in communication with the cylinder bore.

7. In a valve mechanism for compressors or pumps, a cylinder element, a discharge valve seat member having a chamber therein and positioned and supported within said cylinder element, an inlet valve seat member projecting into said chamber and positioned and supported within said discharge valve seat member, and means for holding said seat members in assembled relation.

8. In a valve mechanism for compressors or pumps, a cylinder element having a valve mechanism receiving bore and, at opposite ends of said bore, intake and discharge spaces respectively, said cylinder having communication with said bore through a passage opening into the latter at a point in the side of, and between the ends of the bore, a valve seat member arranged in said bore and itself having a bore for the reception of a second valve seat member, a second valve seat member received in said second bore, valves associated with said seat members, and means for holding said seat members in position.

9. In a valve mechanism for compressors or pumps, a cylinder element having a conical bore, a conical valve seat member arranged in said bore, and providing a valve seat upon an external surface thereof, said valve seat member having a bore for receiving a second valve seat member, a second valve seat member received by said second bore, said valve seat members having valve seats facing in the same direction, valves cooperating with said valve seat members, and means for holding said valve seat members in position.

10. In a valve mechanism for compressors or pumps, a cylinder element having a conical bore and passage means providing communication between the cylinder and said bore at a point in the side of the latter between the ends thereof, a conical valve seat member arranged in said bore and having a bore for receiving a second valve seat member and also having a lateral opening extending between its bore and said passage means, a second valve seat member received in said second bore, valves associated with said valve seat members, and means for holding said valve seat members in position.

11. In a valve mechanism for compressors or pumps, a cylinder element having a conical bore, a conical valve seat member arranged in said bore, said valve seat member having a valve seat formed upon the outer surface of the smaller end thereof and having an internal chamber and a communicating bore, a valve seat member seated within said valve seat bore, and valve mechanisms carried by said valve seat members respectively, the chamber in said first mentioned valve seat member receiving the valve mechanism carried by the second valve seat member.

12. In combination, in a valve mechanism for compressors or pumps, a cylinder element having a conical bore, a conical discharge valve seat member arranged in said bore and having formed therein a chamber and a communicating bore, an inlet valve seat member seated within the bore in said discharge valve seat member, and inlet and discharge valve mechanisms carried by said seat members respectively, the inlet valve mechanism being arranged within said chamber in said discharge valve seat member and said discharge valve mechanism being disposed on the smaller end of said conical discharge valve seat member.

13. In combination, in a valve mechanism for compressors or pumps, a cylinder element having a conical bore, a conical discharge valve seat member arranged in said bore and having formed therein a chamber and a communicating bore, an inlet valve seat member seated within the bore in said discharge valve seat member, and inlet and discharge valve mechanisms carried by said seat members respectively, the inlet valve mechanism being arranged within said chamber in said discharge valve seat member and said discharge valve mechanism being disposed on the smaller end of said conical discharge valve seat member, said cylinder element having formed therein a flow passage for connecting said chamber in communication with the cylinder bore.

14. In a valve mechanism for compressors or pumps, a cylinder element having a conical bore, a conical valve seat member arranged in said bore, said valve seat member having a bore for receiving a second valve seat member, a second valve seat member received by said second bore, said valve seat members having valve seats facing in the same direction, namely, towards the apex of the cone with whose sides the walls of said conical bore coincide, valves cooperating with said valve seat members, and means for holding said valve seat members in position.

15. In a valve mechanism for compressors or pumps, a cylinder element having a conical bore, a conical valve seat member arranged in said bore, said valve seat member having a chamber and a communicating bore, a valve seat member seated within said valve seat bore, and valve mechanisms carried by said valve seat members respectively, the chamber in said first valve seat member receiving the valve mechanism carried by the second mentioned valve seat member, said valve seat members arranged to provide for removal of the valve mechanism carried by said second mentioned valve seat member from said chamber through said communicating bore.

HJALMAR T. BLOM.